Feb. 5, 1952 A. NIHON 2,584,220
LUBRICATING AND COOLING MEANS FOR BEARINGS
Filed Nov. 8, 1945 3 Sheets-Sheet 1

INVENTOR
Alexis Nihon
By E. N. Hetherstonhaugh
ATTORNEY

Feb. 5, 1952 A. NIHON 2,584,220
LUBRICATING AND COOLING MEANS FOR BEARINGS
Filed Nov. 8, 1945 3 Sheets-Sheet 3
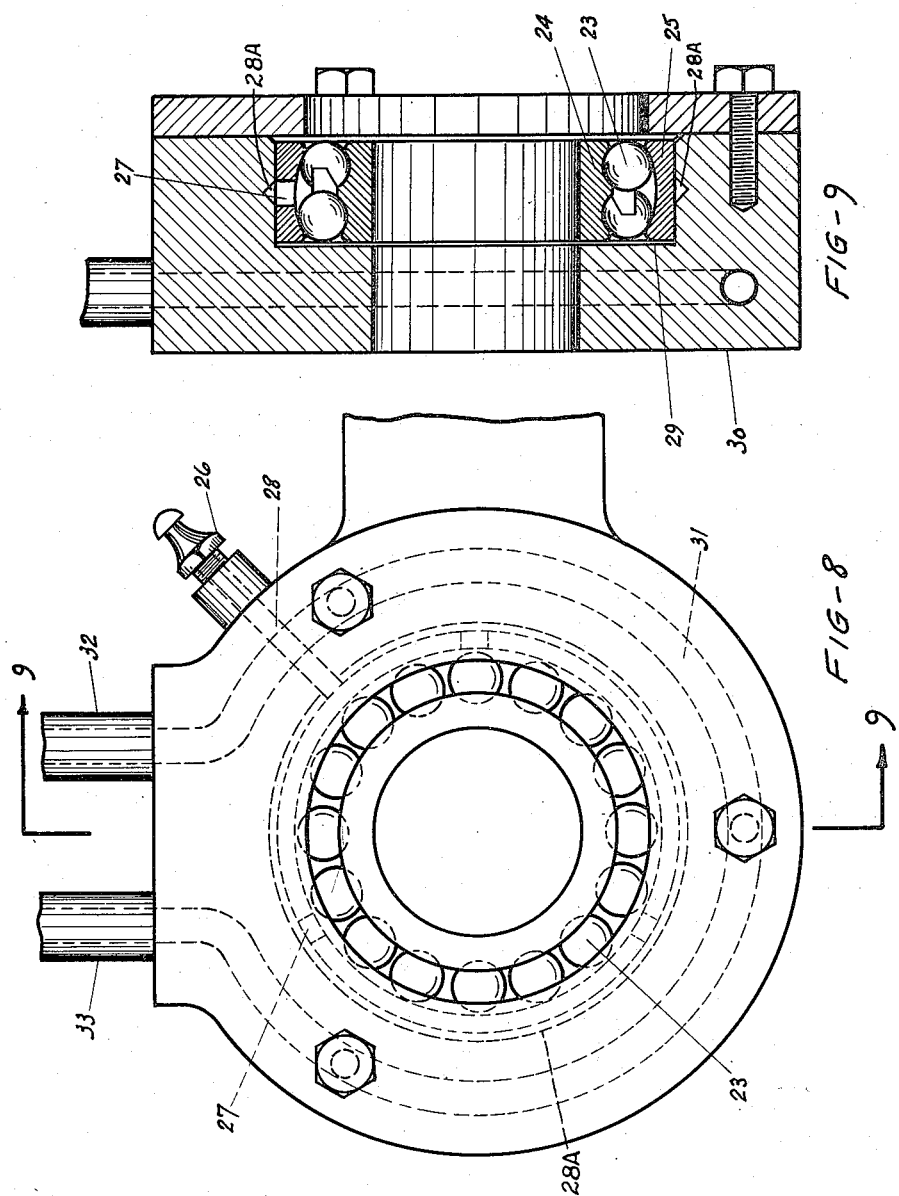
INVENTOR
Alexis Nihon
By E. N. Heatherinlaugh
ATTORNEY Patented Feb. 5, 1952

2,584,220

UNITED STATES PATENT OFFICE 2,584,220

LUBRICATING AND COOLING MEANS FOR BEARINGS

Alexis Nihon, Montreal, Quebec, Canada

Application November 8, 1945, Serial No. 627,415

1 Claim. (Cl. 308—76)

The invention relates to improvements in bearing members for glass drawing machines and the like as described in the present specification and illustrated in the accompanying drawings that form a part of the same.

The invention consists essentially of the novel features of construction as pointed out broadly and specifically in the claim for novelty following a description containing an explanation in detail of acceptable forms of the invention.

The objects of the invention are to prevent tie-ups in production in glass drawing machines due to over-heating and the subsequent expansion of the bearings, thereby literally freezing the rollers which propel the glass through the annealing chamber, the result being the breaking of the glass and delays in repair, causing loss of time and material; to ensure a continuous operation of glass drawing machines or other devices which utilize bearing members of various kinds; to devise a means whereby the temperature of the bearing members may be kept at any predetermined degree in accordance to the degree of heat created by friction or otherwise during the operation of the members; to furnish a cooling system to the bearing members for the purpose of preventing their over-heating; to avoid the necessity of using special grease compounds and in place, to enable the use of ordinary greases owing to the fact that the grease is not subject to intense heat due to the inclusion of a cooling system in the bearing member; and generally to provide a bearing member that will be durable in construction, made of comparatively few and simple parts, economical in use and efficient for its purpose.

In the drawings:

Figure 8 is an enlarged fragmentary plan view of the bearing member as illustrated in Figures 6 and 7.

Figure 9 is a cross-sectional view as taken on the lines 9—9 in Figure 8.

Like numerals of reference indicate corresponding parts in the various figures.

Figure 1:
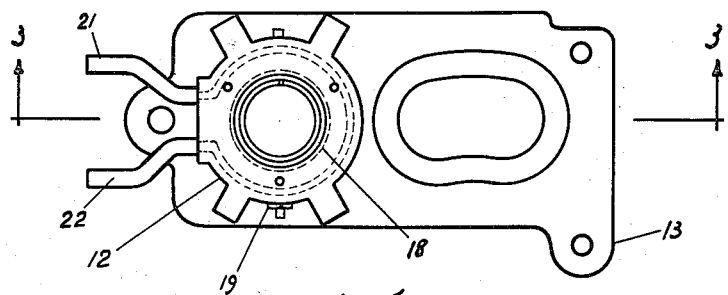
Figure 1 is a plan view of the bearing member.
Figure 2:
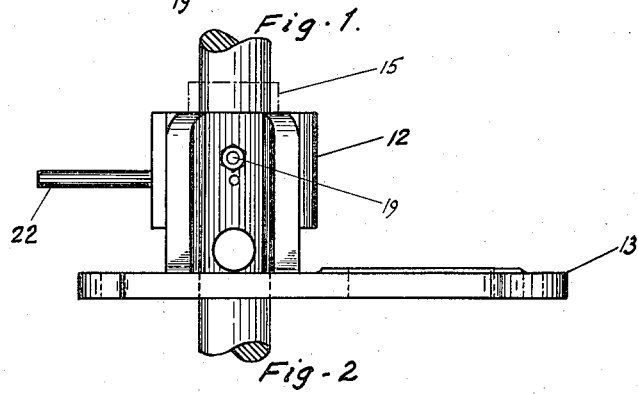
Figure 2 is a side elevation of the bearing member.
Figure 3:
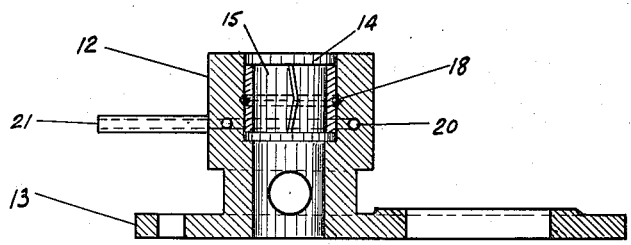
Figure 3 is a longitudinal sectional view of the bearing member, as taken on the lines 3—3 in Figure 1.
Figure 4:
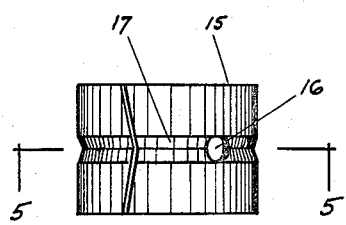
Figure 4 is an enlarged side elevation of a bearing sleeve.
Figure 5:
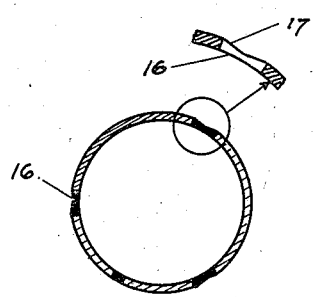
Figure 5 is a cross-sectional view of the bearing sleeve, as taken on the lines 5—5 in Figure 4.

In the drawing of glass, the processes for the manufacture of window glass, glass tubing and the like, include bearing members in which rollers and their shafts rotate for the purpose of drawing the glass, and in such conditions where heat is paramount, it is very important that such bearings be kept at a comparatively low degree of temperature in order to avoid the over-heating of the bearing which consequently freeze the rollers or shafts and cause the breakage of the glass as well as the stoppage of the machine for repairs. This is particularly noticeable in a well known process where the sheet is drawn vertically upwards from drawing chambers which are fed from the melting tank. The glass oozes through a slit in a fireclay floater and is drawn upwards and chilled by water coolers before it reaches the asbestos rollers which propel it up through the annealing chamber. These asbestos rollers are journalled in bearing members and if such bearing members are over-heated the rollers will stop rotating and the result will be that the glass being drawn through the annealing chamber is liable to break and the whole process is stopped until repairs have been accomplished.

Furthermore, the grease which is fed into the bearing member is liable to carbonize and prevent it from spreading, subsequently causing the rollers to stop. It is therefore the purpose of this invention to eliminate these objectionable features by devising a cooling and lubricating system for the bearing members which will prevent the latter from over-heating.

Referring to the drawings, the bearing member consists of a casing, as indicated by the numeral 12 which may be integral or otherwise secured to the bracket 13, the latter adapted to be detachably secured to the apparatus which projects the rollers or shafts which are being used for drawing up the glass, or other purposes.

The casing is provided with a transverse orifice 14 which forms a channel for a bearing sleeve 15 of the split type, which bearing sleeve is movably fitted within the transverse orifice 14 in the casing 12. A roller or shaft is rotatably supported in this bearing sleeve. The bearing sleeve 15 has a plurality of apertures 16 which form inlets for a lubricant, which oozes between the sleeve and the roller. These apertures may be connected to one another, if desirable, by a trough-like channel 17 formed in the circumference of the sleeve. The inner circumference of the orifice is provided with a lubricant groove 18 which is in alignment with the apertures 16 of the bearing sleeve. A lubricant feed inlet 19 is formed through the casing 12 and terminates in the lubricant groove 18.

The circulating water compartment 20 is formed within the casing 12 and has the inlet 21 and the outlet 22, the inlet and outlet being suitably connected to the feed and return lines which may be flexible or otherwise.

Figure 7:
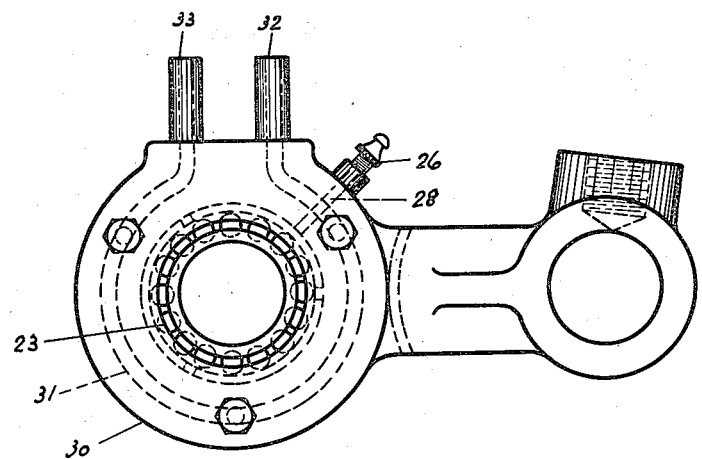
Figure 7 is a plan view of the bearing member as illustrated in Figure 6.
Figure 6:
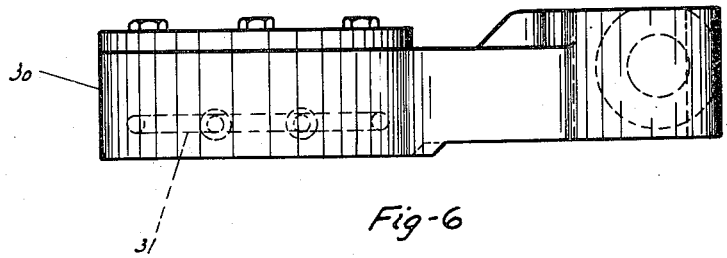
Figure 6 is a side elevation of another form of bearing member.

The same features with respect to cooling the bearings as hereinabove mentioned, is shown in another type of bearing member in Figures 6, 7 and 8. In such a type, ball anti-friction bearings 23 are used, suitably guided in the inner and outer ball races 24 and 25, and the lubricant is fed into the bearing by means of the feed inlet 26 and aperture 28. A plurality of apertures 27 extend through the outer ball race and are connected by an annular lubrication groove 28A in the casing. The aperture 28 extending inward from the feed inlet 26 connects with this annular groove 28A thus carrying the lubricant to the apertures 27. The roller friction bearing is seated in the orifice 29 of the casing 30 and the latter is provided with a circulating water compartment 31 having the inlet 32 and outlet 33 which are suitably connected by feed and return lines.

It will be evident from the foregoing that the bearing members are assured of being kept at a proper temperature and that any heat energized will be absorbed through the cooling system and lubricant is fed in such a way that all the frictional parts of the bearing will be properly lubricated.

What I claim is:

In a bearing member for a glass drawing machine, a bracket, a cylindrical casing rigid with said bracket and being integral therewith, said cylindrical casing having a transverse orifice, a bearing sleeve having a split in the wall thereof, said bearing sleeve being movably fitted within the transverse orifice in said casing, a roller rotatably supported in said bearing sleeve, said bearing sleeve having a plurality of apertures extending radially therethrough, a trough-like channel formed in the periphery of said bearing sleeve and forming a connection with each of the apertures extending therethrough, the surface of the transverse orifice in said casing having an annular lubricant groove in alignment with the trough-like channel formed in the periphery of said bearing sleeve, a lubricant feed inlet extending through said casing and terminating in the annular lubricant groove as formed in the surface of the transverse orifice in said casing, a water compartment formed within said casing and having an inlet and an outlet connected to feed and return lines permitting circulation of water within said water compartment, and said water compartment being of a somewhat U-shape with the aforesaid inlet and outlet connected to the ends thereof.

ALEXIS NIHON.

REFERENCES CITED

The following references are of record in the file of this patent:

UNITED STATES PATENTS

| Number | Name | Date |
|---|---|---|
| 418,123 | Grimm | Dec. 24, 1889 |
| 763,409 | Lind | June 28, 1904 |
| 1,300,023 | Riegel | Apr. 8, 1919 |
| 1,909,410 | Klosson | May 16, 1933 |
| 2,217,295 | Paine | Oct. 8, 1940 |
| 2,223,847 | Engdahl | Dec. 3, 1940 |
| 2,352,206 | Kendall | June 27, 1944 |